C. H. SAMPSON.
CHECK PROTECTOR.
APPLICATION FILED DEC. 9, 1910.
1,010,180.
Patented Nov. 28, 1911.
5 SHEETS—SHEET 5.
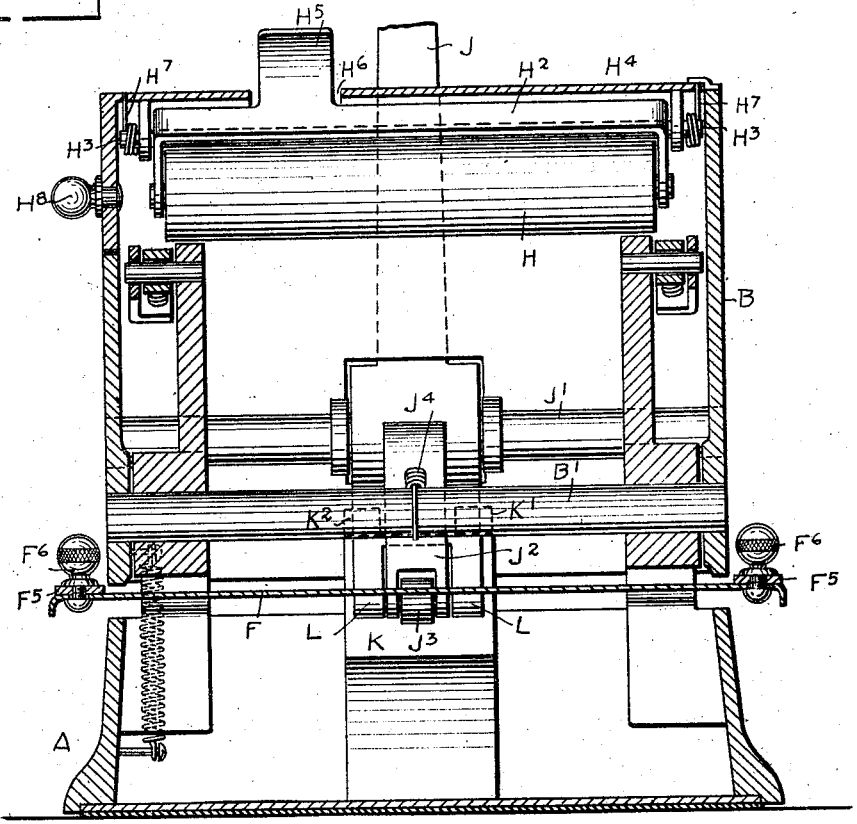
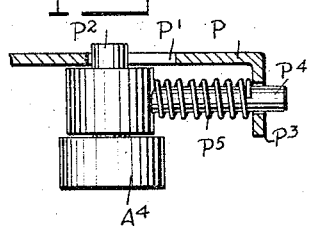
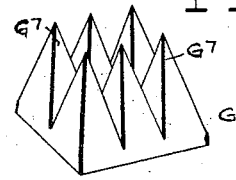
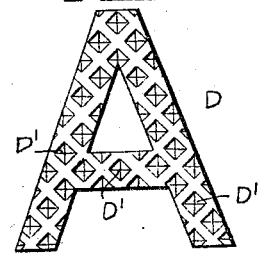
WITNESSES
INVENTOR
Charles H. Sampson
BY
ATTORNEYS

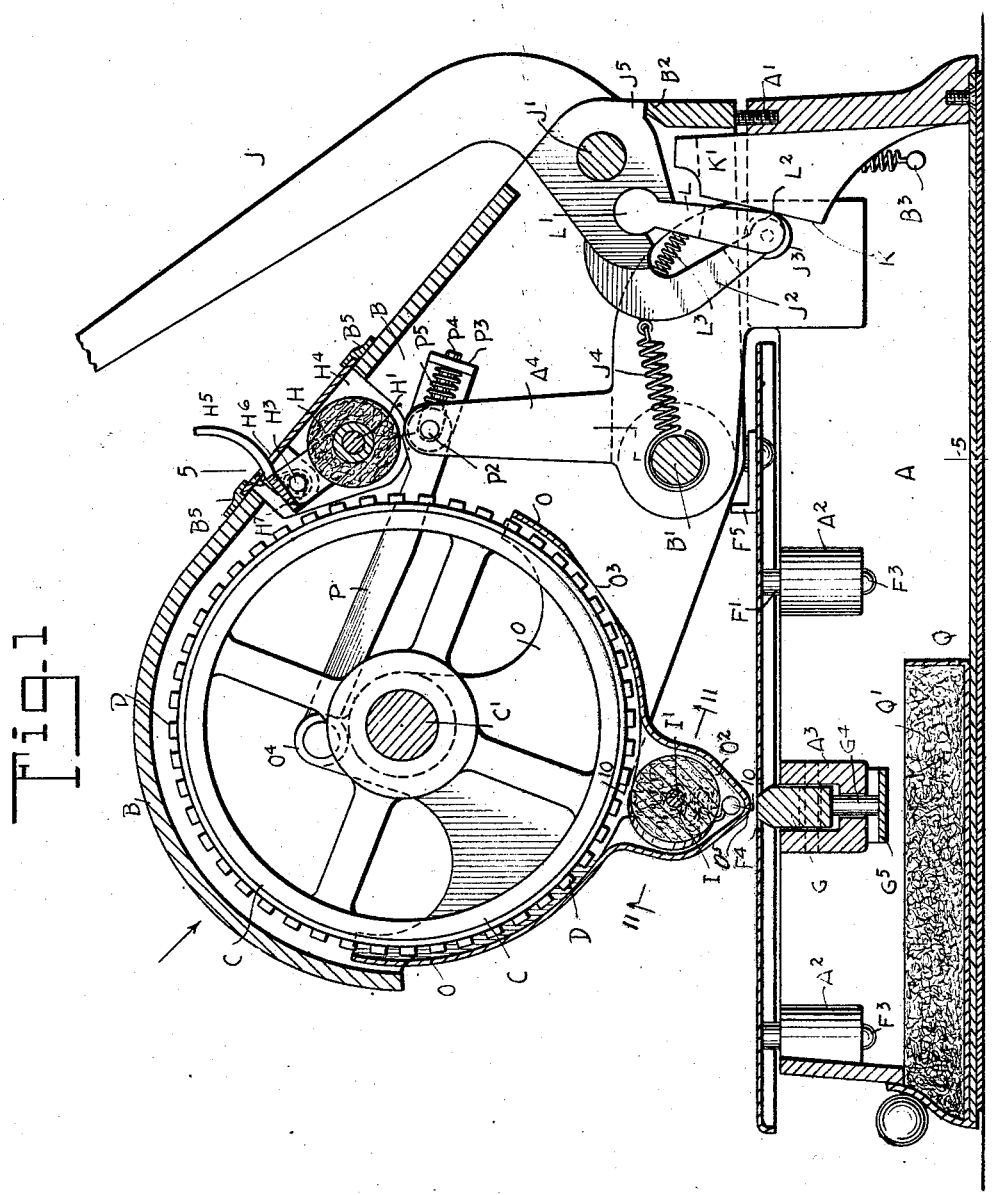

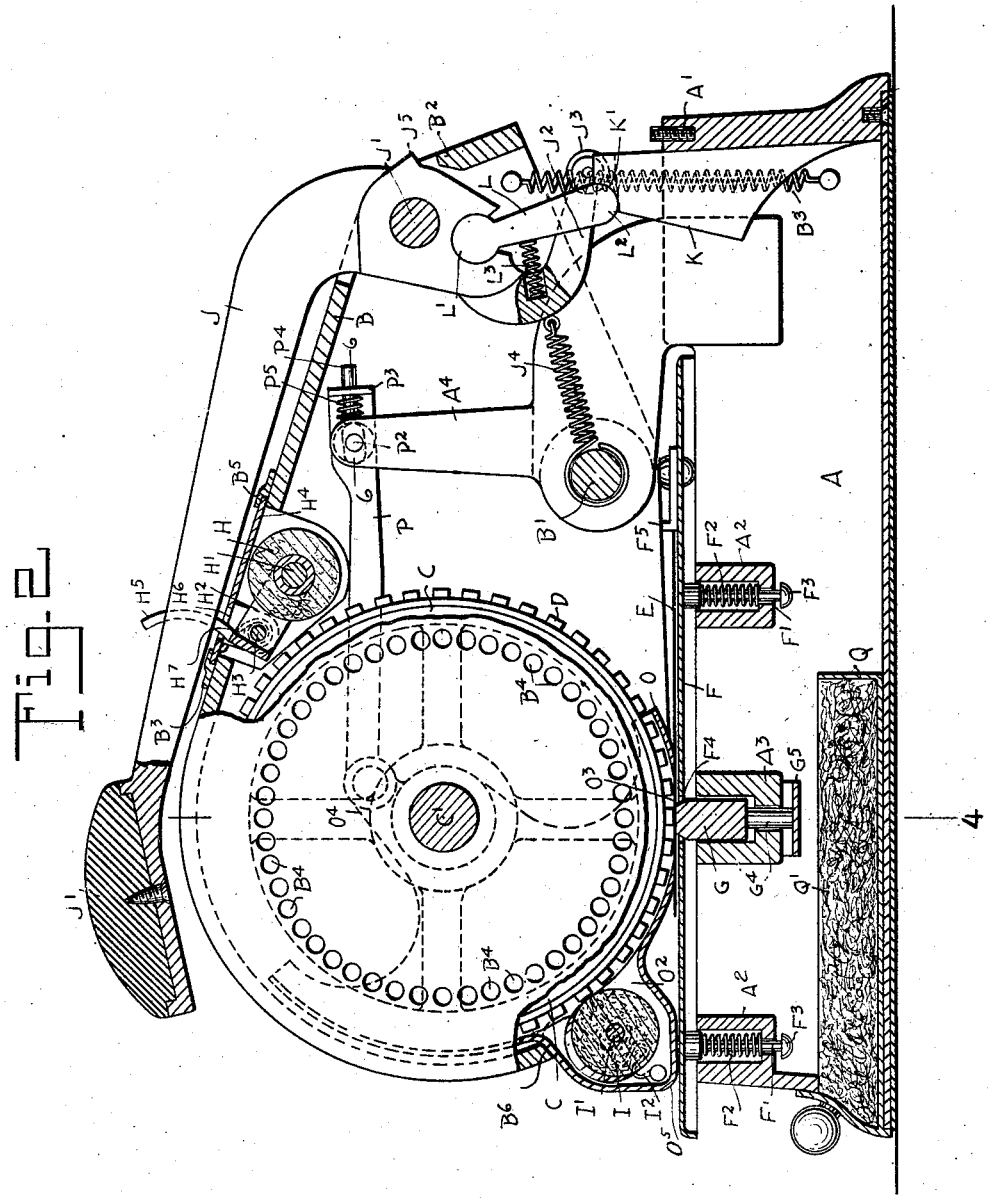

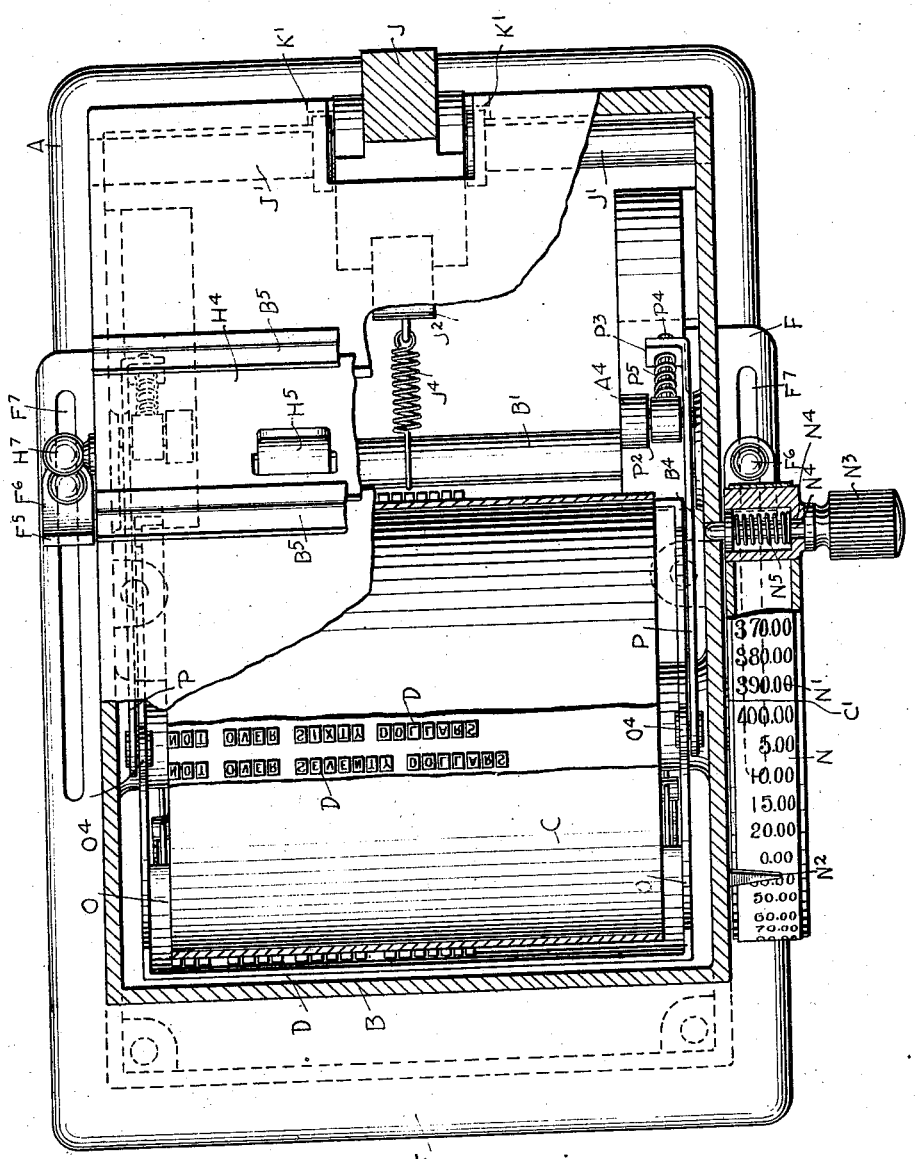

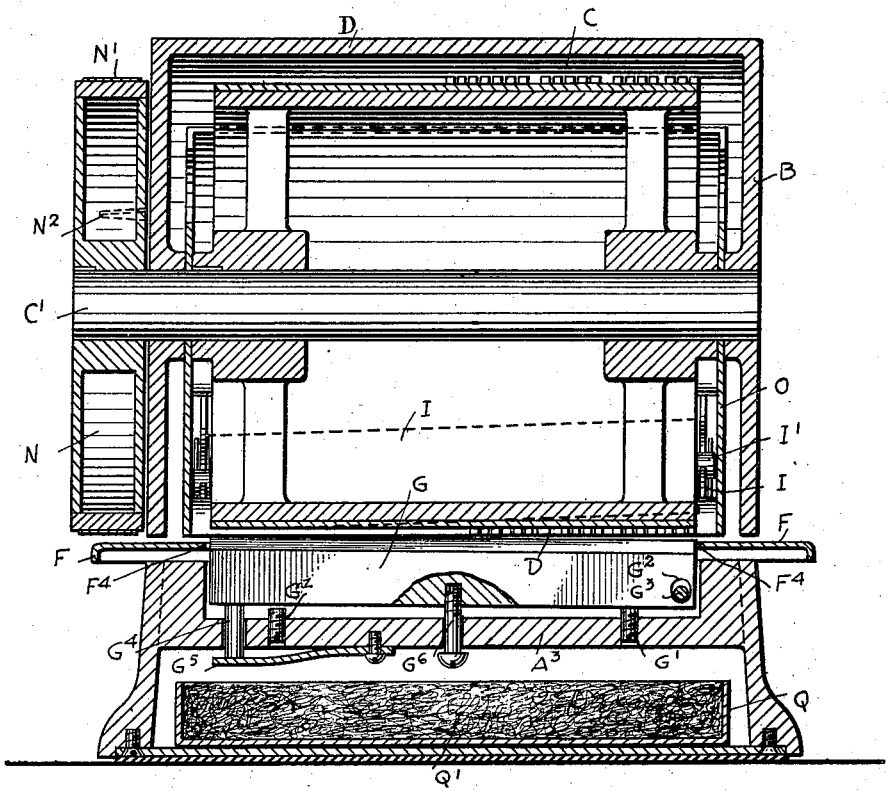
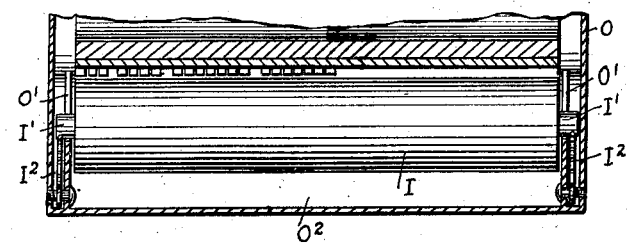
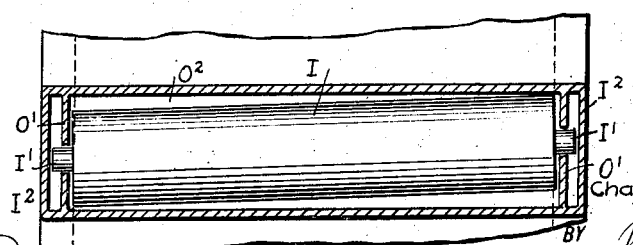

UNITED STATES PATENT OFFICE.

CHARLES HENERY SAMPSON, OF ROCHESTER, NEW YORK, ASSIGNOR, BY DIRECT AND MESNE ASSIGNMENTS, TO THE DEFENDOGRAPH COMPANY, OF ROCHESTER, NEW YORK, A CORPORATION

CHECK-PROTECTOR.

1,010,180.  Specification of Letters Patent.  Patented Nov. 28, 1911.

Application filed December 9, 1910. Serial No. 596,440.

*To all whom it may concern:*

Be it known that I, CHARLES H. SAMPSON, a citizen of the United States, and a resident of Rochester, in the county of Monroe and State of New York, have invented a new and Improved Check-Protector, of which the following is a full, clear, and exact description.

The invention relates to check protectors employed for providing a check with a mark pressed into the paper and representing a certain sum, and the words "Not over."

The object of the invention is to provide a new and improved check protector arranged to permit the user to view the line of the check where the printing is to take place, and to provide a single hand lever mechanism for controlling the movement of the printing parts.

In order to accomplish the desired result, use is made of a casing carrying a revoluble die holder provided with printing dies, the casing being mounted to swing bodily to form with the platen a large throat for the convenient insertion of the check to be printed on.

A practical embodiment of the invention is represented in the accompanying drawings forming a part of this specification, in which similar characters of reference indicate corresponding parts in all the views.

Figure 1 is a sectional side elevation of the check printing protector; Fig. 2 is a like view of the same showing the parts in printing position; Fig. 3 is a plan view of the same, parts being in section; Fig. 4 is a sectional front elevation of the check protector on the line 4—4 of Fig. 2; Fig. 5 is a like view of the same on the line 5—5 of Fig. 1; Fig. 6 is an enlarged sectional plan view of the bearing and stop for the operating link-controlling movement of the frame carrying the ink distributing roller, the section being on the line 6—6 of Fig. 2; Fig. 7 is an enlarged perspective view of a portion of the anvil die; Fig. 8 is an enlarged face view of one of the types; Fig. 9 is a plan view of the anvil die; Fig. 10 is a sectional front elevation of the die holder and ink-distributing roller, the section being on the line 10—10 of Fig. 1; and Fig. 11 is a sectional plan view of the ink-distributing roller, the section being on the line 11—11 of Fig. 1.

On a suitably constructed base A is journaled the pivot B' of a casing B, in which is journaled the shaft C' of the revoluble cylindrical die holder C, provided on its peripheral face with sets of transversely-extending printing dies D, each set of printing dies representing a certain sum and the words "Not over," as plainly shown in Fig. 3, and any one of the said sets of dies D is adapted to be moved into a lowermost operating position on turning the die holder C correspondingly, so that this lowermost set of dies D makes an impression on the check E held on top of a platen F yieldingly mounted on the base A. The under side of the check E, directly opposite the set of dies in lowermost or active position at the time, is adapted to be engaged by an anvil at G, so that when the casing B is swung downward and with it the die holder C then an imprint is made on the check E between the lowermost or active set of dies D and the anvil die G. Each of the printing dies or types in a set represents a letter of the alphabet, numeral or other character (see Fig. 8), and the face of each printing die or type is provided with pockets D' for the reception of ink, and the face of the anvil die G is provided with points G⁷ (see Fig. 7) adapted to puncture or locally tear the paper of the check E and to pass into the registering pockets D', so that the ink in the pockets D' is displaced and readily penetrates and saturates the rough edges of the puncture or tear in the check paper, thereby preventing changing or effacing of the imprint by unauthorized persons.

In the manufacture of the dies D the latter are cast with flat faces, that is, without the pockets D'. and the dies are placed in position on the die holder C, after which each set of dies when in a lowermost position is pressed into engagement with the points G⁷ to form the pockets D' in the face of each die, as shown in Fig. 8, and hence when the machine is used the points G⁷ of the anvil die G are always in register with the pockets D' produced by the said points G⁷. The points G⁷ of the anvil die G and the pockets D' of the printing dies or types D are preferably arranged in diagonal rows, as indicated in Figs. 8 and 9.

The sets of dies D and their pockets D' are periodically supplied with ink from a manually-controlled inking roller H mounted on the casing B, and the ink supplied to the dies D by the said inking roller H is distributed by an ink-distributing roller I adapted to pass over the lowermost sets of type D to each up and down swinging movement given to the frame B, as hereinafter more fully explained. An up and down swinging motion is given to the casing B by the use of an operating lever J extending over the top of the casing B and having its forward end provided with a hand piece $J^6$ adapted to be taken hold of by the operator for actuating the lever J with a view to swing the casing B up or down. The lever J is fulcrumed at $J'$ on the casing B and the said lever J is provided with an extension arm $J^2$ carrying a friction roller $J^3$ adapted to travel over a cam K attached to or forming part of the base A, so that during the time that the friction roller $J^3$ travels up the cam surface K on swinging the lever J downward a like downward swinging movement is given to the casing B, and when the lowermost set of dies moves close to the check E then in position on the platen F then the friction roller $J^3$ leaves the upper end of the cam surface K, and then the lever J and the casing B swing from a link L pivotally connected at its upper end $L'$ with the lever J adjacent to its fulcrum $J'$, the lower end $L^2$ of the said lever then being seated on the bearing $K'$ adjacent to the cam surface K. A spring $L^3$ is interposed between the extension arm $J^2$ and the link L so as to engage the link L with the bearing $K'$ as soon as the friction roller $J^3$ leaves the upper end of the cam surface K.

By the arrangement described, the lever J first imparts a fast initial downward swinging movement to the casing B until the friction roller $J^3$ leaves the cam surface K, and then a slow final downward movement is given to the casing B by the latter and the lever J swinging on the link L so that the impression is made on the check E during the time a slow movement is given to the casing B and the die holder C and the sets of type D carried thereon.

By the arrangement described, a perfect and powerful impression is made on the check E by the set of dies D in lowermost or active position at the time. A spring $J^4$ is connected with the extension arm $J^2$ of the operating lever J so that when the operator releases the pressure on the hand piece $J'$ after the impression is made then the lever J is swung upward and with it the casing B and the parts carried thereby.

The upward swinging motion of the lever J is limited by a stop lug $J^5$ formed on the lever J, engaging a shoulder $B^2$ formed on the casing B, and the upward swinging motion of the casing B is limited by engaging a stop screw $A'$ screwing on the rear of the base A, as shown in Figs. 1 and 2. The casing B is normally held in uppermost position by a spring $B^3$ connecting the rear end of the casing B with the base A.

In order to permit of setting the die holder C to bring a desired set of dies into lowermost active position, the following arrangement is made: On one outer end of the shaft $C'$ of the die holder C is secured an indicating wheel N provided on its peripheral face with characters $N'$ indicating amounts in dollars corresponding to the amounts given on the sets of dies D, and on the casing B is arranged a pointer $N^2$ indicating on the said figures $N'$, the said figures $N'$ and the dies D being so arranged that when the pointer $N^2$ indicates on a certain character $N'$ of a given amount, the set of dies D of a corresponding amount is in lowermost or active position at the time. The wheel N is provided with a handle or knob $N^3$ under the control of the operator for turning the wheel N until the desired amount is opposite the pointer $N^2$ and the said knob $N^3$ is provided with a shank $N^4$ mounted to slide transversely in the wheel N and pressed on by a spring $N^5$. The rear end of the shank $N^4$ is adapted to pass into one of a series of apertures $B^4$, arranged on the side of the casing B in a circle concentric with the die holder C. When it is desired to turn the die holder C, the operator pulls the knob $N^3$ outward until the shank $N^4$ has disengaged the corresponding aperture $B^4$, and then the die holder C is turned until the desired amount registers with the pointer $N^2$ and then the operator releases the knob $N^3$ so that the spring $N^5$ thereof presses the knob $N^3$ rearward and engages the rear end of the shank $N^4$ with a corresponding aperture $B^4$, thus locking the die holder C against rotation in the casing B for the time being.

The platen F is provided with depending guide pins $F'$, mounted to slide in bearings $A^2$ formed in the base A, and springs $F^2$ coiled on the said pins $F'$ and resting on the bearings $A^2$ yieldingly support the platen F a distance above the top of the base A, and the upward movement of the platen is limited by heads $F^3$ on the guide pins $F'$ engaging the under side of the bearings $A^2$ (see Fig. 1).

The platen F is provided with an opening $F^4$ into which extends the upper end of the anvil die G held movable in a guideway or bearing $A^3$ formed on the base A. The anvil die is adapted to rest on adjustable supporting pins $G'$ screwing in the bottom of the bearing $A^3$ (see Fig. 4), and one end of the anvil die G is provided with an elongated slot $G^2$ through which extends a pivot pin $G^3$ held in the sides of the bearing $A^3$, and on the other end of the anvil die G is arranged a depending pin $G^4$ pressed on by a spring $G^5$, attached to the under side of the bearing $A^3$, the spring $G^5$ serving to normally hold the anvil die G in an inclined position (see Fig. 4), so that when the casing B is swung downward one end of the lowermost set of printing dies D moves in contact with the opposite portion of the anvil die G and the latter is gradually swung downward until it rests horizontally on the pins G'. By this coacting movement of the printing die and anvil die, a gradual tearing of the paper placed between the dies takes place with a sort of shearing cut, thereby requiring less physical exertion on the part of the operator to make an impression. A headed pin $G^6$ depending from the middle of the anvil die G and engaging the bearing $A^3$ serves to limit the upward movement of the die G caused by the action of the spring $G^5$.

In order to properly position the check E relative to the anvil die G and the set of printing dies D in active or lowermost position at the time, use is made of gages $F^5$ adjustably secured to the platen F at the sides thereof near the rear end of the platen by the use of clamping screws $F^6$ engaging the gages $F^5$ extending through elongated slots $F^7$ formed lengthwise in the platen F near the sides thereof, as plainly shown in Fig. 3.

The inking roller H has its shaft H' journaled in a frame $H^2$ fulcrumed on a rod $H^3$ held in suitable bearings on a slide $H^4$, slidably mounted in guideways $B^5$ arranged on the top of the casing B. The frame $H^2$ is provided with a finger piece $H^5$ projecting through an opening $H^6$ in the slide $H^4$ to be within convenient reach of the operator for imparting a swinging motion to the frame $H^2$ so as to move the inking roller H in engagement with the printing dies D to ink the same. The inking roller H is normally held out of contact with the printing dies D by the use of springs $H^7$ coiled on the rod $H^3$ and pressing the frame $H^2$ in an upward direction so as to hold the inking roller H out of contact with the dies D. A knob $H^8$ is held on one side of the slide $H^4$ to permit of conveniently sliding the same in place in the guideways $B^5$ or removing it therefrom whenever it is desired to place ink on the inking roller H at the time the latter is detached from the casing B, and after the ink is supplied to the inking roller H the parts are returned to position on the casing B, as shown in the drawings.

The ink-distributing roller I has its shaft I' journaled in bearings O' formed in a pocket $O^2$ integral on a segmental clamping frame O fulcrumed loosely on the shaft C' of the die holder C. Springs $I^2$ held in the pocket $O^2$ press against the under side of the shaft I' so as to engage the peripheral face of the sets of printing dies D. The axis of the ink-distributing roller I is slightly inclined to the axis of the shaft C', as plainly indicated in Fig. 11, so that a proper distribution of the ink on the printing dies D takes place. The frame O previously mentioned is provided with an opening $O^3$, into which extends the lowermost printing die D at the time the casing B is pressed downward, so that the lowermost printing die makes an impression on the check E opposite the anvil die G. During the up and down swinging motion of the casing B a swinging motion is given to the frame O so as to move the ink-distributing roller I over the printing dies D, and for this purpose the following arrangement is made: The frame O is provided with upward extensions $O^4$ pivotally connected with links P extending rearwardly, and each having a slot P' into which extends a pin $P^2$ held on a bracket $A^4$ rising from the base A, as plainly indicated in Figs. 1 and 2. The rear end of the link P is provided with an angular lug $P^3$ through which extends a plunger $P^4$ fulcrumed on the pin $P^2$, and on the said plunger $P^4$ is coiled a spring $P^5$ pressing on the lug $P^3$ in a rearward direction. Now when the several parts are in the normal dormant position shown in Fig. 1, then the pocket $O^2$ with the ink-distributing roller I is directly above the anvil die G, to permit of conveniently placing the check E in position so that the operator can view the point at which the impression is made and can position the check E correspondingly on top of the platen F. When a downward swinging motion is given to the casing B, as above explained, and on the operator swinging the lever J downward then a swinging motion is given to the frame O in a forward direction until the opening $O^3$ is opposite the anvil die G and the lowermost printing die D to make the impression on the check on the final downward swinging motion given to the casing B, as previously explained. The forward swinging motion of the clamping frame O is limited by the pocket $O^2$ abutting against a shoulder $B^6$ on the casing B at the time the casing B is on the last portion of its downward stroke.

It is understood that when the casing B swings downward the link P exerts a pull on the frame O so as to impart a forward swinging motion to the same, and when the casing B swings upward a return swinging motion is given to the frame O to swing the same into the position shown in Fig. 1. Thus from the foregoing it will be seen that by the arrangement described a swinging motion is given to the frame O forward and backward on the up and down swinging motion of the casing B so that the ink on the printing dies D is properly distributed by the roller I on the said printing dies.

The bottom $O^5$ of the pocket $O^2$ is approximately V-shape (see Fig. 1), and in order to normally locate the said pocket bottom $O^5$ directly over the anvil die G at the time the parts are in normal inactive position shown in Fig. 1, the stop screw A' at the rear end of the base A is screwed up or down whereby the position of the casing B and that of the frame O is correspondingly changed, that is, the bottom $O^5$ of the pocket O' is moved farther forward or backward to permit the operator to place the check E accurately in position, that is, with the line to be printed on directly under the bottom $O^5$. In the bottom of the base A is mounted to slide a drawer Q containing an inking pad Q' for engagement by the roller H when the latter is removed from the machine, and the drawer Q is drawn out to supply the inking roller H periodically with ink.

The operation is as follows: When the several parts are in the position shown in Fig. 1, the operator first sets the type holder C so as to bring that set of printing dies D into a lowermost position which corresponds in amount to the amount to be printed on the check. It is understood that for this purpose the operator takes hold of the knob $N^3$ and first pulls the same outward to unlock the wheel N, which is then turned until the amount to be printed on the check is in register with the pointer $N^2$, after which the knob $N^3$ is released to lock the wheel N as well as the die holder C against rotation. The operator now places the check E in position on the platen F so that the rear edge of the check abuts against the gages $F^5$ with a view to bring the proper space for receiving the impression directly over the anvil die G, it being understood that the operator can view the positioning of the check from the front of the machine owing to the large throat formed between the platen F and the bottom of the casing B. The operator now takes hold of the hand piece J' of the lever J and presses the latter downwardly so that a downward swinging movement is given to the casing B and the parts carried thereby, whereby the bottom of the frame O is moved in contact with the top of the check E and presses the same firmly in place on the platen F and over the top of the anvil die G. A further downward movement of the casing B brings the lowermost set of printing dies D in contact with the top of the check E to make an impression thereon, as previously explained, after which the operator, releases the pressure on the lever J to allow the spring $B^3$ to return the lever J and the casing B to uppermost normal position. The check E is then removed from the machine. It is understood that during the last portion of the downward swinging motion of the casing B the clamping frame O engages the upper face of the check E on opposite sides of the anvil die G and presses the check E firmly down on the yieldingly mounted platen F, so that the check is firmly clamped in place during the subsequent printing by the lowermost dies D. The forward swinging motion of the frame O is limited by the pocket $O^2$ abutting against a shoulder $B^6$ of the casing B (see Fig. 2), at the time the clamping frame O engages the upper face of the check, and during the final downward movement of the casing B, the swinging motion of the clamping frame O ceases, the links P now sliding forward on the pins $P^2$ and compressing the springs $P^5$. Thus by the arrangement described the check is firmly clamped between the platen F and the clamping frame O without danger of shifting of the check during the time the impression is made. By having the faces of the printing dies and the anvil die roughened or pointed, the paper is crushed or minutely ruptured during the time the impression is made, so that the ink on the printing die penetrates into the rupture, thus preventing changing of the amount printed on the check by unauthorized persons.

Having thus described my invention, I claim as new and desire to secure by Letters Patent:

1. A check protector, comprising an anvil die, a casing mounted to swing toward and from the said anvil die, a die holder carried by the said casing and provided with sets of dies, any one set of which can be moved into operative position relative to the said anvil die, an operating lever fulcrumed on the said casing and having a limited movement relatively thereto, a fixed bearing disposed partially within the path of travel of said lever and adapted to be engaged by said lever, a fixed cam for the lever to ride on, and a controlling link hung on the said operating lever and adapted to abut against the fixed bearing.

2. A check protector, comprising an anvil die, a casing mounted to swing toward and from the said anvil die, a die holder carried by the said casing and provided with sets of dies, any one set of which can be moved into operative position relative to the said anvil block, an operating lever fulcrumed on the said casing and having a limited movement relatively thereto, a fixed bearing disposed partially within the path of travel of said lever and adapted to be engaged by said lever, a fixed cam for the lever to ride on, a controlling link hung on the said operating lever and adapted to abut against the fixed bearing, and a spring interposed between the said lever and the said link.

3. A check protector, comprising an anvil die, a casing mounted to swing toward and from the said anvil die, a die holder carried by the said casing and provided with sets of dies, any one set of which can be moved into operative position relative to the said anvil block, an operating lever fulcrumed on the said casing and having a stop lug adapted to abut against the casing so that said lever has a limited movement relatively to said casing, a fixed bearing disposed adjacent to the path of travel of said lever, a fixed cam for the said operating lever to travel on, and a controlling link pivotally connected with the said lever and adapted to be seated on the said bearing.

4. A check protector, comprising an anvil die, a casing mounted to swing toward and from the said anvil die, a die holder carried by the said casing and provided with sets of dies, any one set of which can be moved into operative position relative to the said anvil die, an operating lever fulcrumed on the said casing and having a stop lug adapted to abut against the casing said lever having a limited movement relatively to said casing, a fixed bearing disposed adjacent to the path of travel of said lever relatively to said casing, a fixed cam for the said operating lever to travel on, a controlling link pivotally connected with the said lever and adapted to engage said bearing.

5. A check protector, comprising a yieldingly mounted platen having an opening, an anvil die extending in the said opening, a casing mounted to swing, a revoluble die holder mounted on the said casing and provided with sets of dies, any one of which is adapted to be moved into operative position relative to the said anvil die, an operating lever and link mechanism for imparting a swinging motion to the said casing, and an ink-distributing roller adapted to move over the dies at and near operative position.

6. A check protector, comprising a yieldingly mounted platen having an opening, an anvil die extending in the said opening, a casing mounted to swing, a revoluble die holder mounted in the said casing and provided with sets of dies, any one of which is adapted to be moved into operative position relative to the said anvil die, an operating lever and link mechanism for imparting a swinging motion to the said casing, an ink-distributing roller for the said dies, a frame carrying the said ink-distributing roller and mounted to swing loosely on the axis of the said die holder, a link pivotally connected with the said frame, a fixed pin on which the said link is mounted to slide, and a spring pressing the said link.

7. A check protector provided with a yieldingly mounted platen having an opening, stops adjustably secured to the said platen, an anvil die extending in the said opening, a casing mounted to swing and forming with the said platen a large throat for the insertion of the check, a revoluble die holder mounted in the said casing and provided with printing dies, and manually-controlled means for imparting a swinging motion to the said casing.

8. A check protector provided with a yieldingly mounted platen having an opening, stops adjustably secured to the said platen, an anvil die extending in the said opening, a casing mounted to swing and forming with the said platen a large throat for the insertion of the check, a revoluble die holder mounted in the said casing and provided with printing dies, manually-controlled means for imparting a swinging motion to the said casing, adjustable supports for the said anvil die, a pivot for one end of the said anvil die, and a spring pressing the other end of the said anvil die.

9. A check protector provided with a yieldingly mounted platen having an opening, stops adjustably secured to the said platen, an anvil die extending in the said opening, a casing mounted to swing and forming with the said platen a large throat for the insertion of the check, a revoluble die holder mounted in the said casing and provided with printing dies, manually-controlled means for imparting a swinging motion to the said casing, adjustable supports for the said anvil die, a pivot for one end of the said anvil die, a spring pressing the other end of the said anvil die, and a stop for limiting the upward movement of the said anvil die.

10. A check protector, comprising a platen, a casing mounted to swing toward and from the said platen, a revoluble die holder mounted on the said frame and provided with sets of printing dies, manually-controlled means for turning the holder to move any one of the said sets of dies into lowermost operative position, a distributing roller for the ink on the said dies, a frame in which the said inking roller is journaled, the said frame having an opening for the die in operative position at the time, the said frame being adapted to engage the face of the check to hold the same in place on the platen during the printing operation, and means for imparting a swinging motion to the said frame on imparting a swinging motion to the casing.

11. A check protector, comprising a platen, a casing mounted to swing toward and from the said platen, a revoluble die holder mounted in the said frame and provided with sets of printing dies, manually-controlled means for turning the holder to move any one of the said sets of dies into lowermost operative position, a distributing roller for the ink on the said dies, a frame in which the said inking roller is journaled, the said frame having an opening for the die in operative position at the time said frame is adapted to engage the face of the check to hold the same in place on the platen during the printing operation, a spring-pressed link pivotally connected with the said frame, and a fixed bearing for the link to slide on and to limit its sliding motion.

12. A check protector provided with a casing, a revoluble die holder held in the said casing and provided with printing dies, an inking roller for the said dies, a slide removably held on the said casing, a spring-pressed frame mounted to swing on the said slide and carrying the said inking roller, and a finger piece on the said frame for imparting a swinging motion to the said frame to move the inking roller into contact with the said dies.

13. A check protector provided with a base, a spring-pressed platen mounted to slide up and down on the said base, gages held adjustable on the said platen, an anvil die mounted on the base and projecting into an opening in the said platen, a casing mounted to swing toward and from the said platen, a revoluble die holder mounted to turn in the said casing, printing dies on the peripheral face of the said die holder, and a clamping frame mounted to swing loosely on the axis of the said die holder and receiving a swinging motion on the up and down swinging of the said casing.

14. A check protector provided with a base, a spring-pressed platen mounted to slide up and down on the said base, gages held adjustable on the said platen, an anvil die mounted on the base and projecting into an opening in the said platen, a casing mounted to swing toward and from the said platen, a revoluble die holder mounted to turn in the said casing, printing dies on the peripheral face of the said die holder, a clamping frame mounted to swing loosely on the axis of the said die holder and receiving a swinging motion on the up and down swinging of the said casing, and an ink-distributing roller for the said printing dies journaled in the said clamping frame.

15. A check protector provided with a base, a spring-pressed platen mounted to slide up and down on the said base, gages held adjustable on the said platen, an anvil die mounted on the base and projecting into an opening in the said platen, a casing mounted to swing toward and from the said platen, a revoluble die holder mounted to turn in the said casing, printing dies on the peripheral face of the said die holder, a clamping frame having an opening and a pocket, the opening being adapted to register with the said anvil die, an ink-distributing roller for the said printing dies, and means connecting the said frame with the said base for imparting a swinging motion to the said frame on swinging the casing up and down.

16. A check protector, comprising a casing mounted to swing, a clamping frame mounted to swing on the said casing and having a V-shaped bottom, an anvil die, and means controllable by movements of said casing for shifting said bottom forward or backward relative to the anvil die for positioning the check.

17. A check protector, comprising a casing mounted to swing, a clamping frame mounted to swing on the said casing and having a V-shaped bottom, an anvil die, means for imparting a swinging motion to the said frame independent of the said casing, and mechanism including an adjustable stop for the said casing to adjust the said bottom relative to the anvil die for positioning the check.

18. A check protector, provided with an anvil die mounted to swing and normally held in a position inclined relatively to the horizontal, a die holder movable toward and from the said anvil die, and a printing die held on the said holder and adapted to engage the said anvil die and gradually swing the same into horizontal position.

19. A check protector provided with an anvil die mounted to swing, a spring pressing the said anvil die to normally hold the same in a position inclined relatively to the horizontal, and a printing die movable toward and from the said anvil die to gradually swing the anvil die into horizontal position.

20. A check protector provided with an anvil die mounted to swing, a spring pressing the said anvil die to normally hold the same in a position inclined relatively to the horizontal, a printing die movable toward and from the said anvil die to gradually swing the anvil die into horizontal position, and means for limiting the downward swinging motion of the said anvil die.

21. A check protector provided with an anvil die mounted to swing, a spring pressing the said anvil die to normally hold the same in a position inclined relatively to the horizontal, a printing die movable toward and from the said anvil die to gradually swing the anvil die into horizontal position, means for limiting the downward swinging motion of the said anvil die, and means for limiting the upward swinging motion of the said anvil die.

22. A check protector, comprising a casing mounted to swing, a clamping frame journaled upon said casing and adapted to swing relatively to the same, an anvil die, a die carried by said casing and movable toward and from said anvil die, and means including a limiting stop for predetermining the extent of movement of said clamping frame relatively to said casing.

23. A check protector, comprising a main frame, a casing journaled relatively thereto and adapted to swing, an anvil die mounted upon said main frame, a printing die carried by said casing and adapted to move toward and from said anvil die, a clamping frame carried by said casing for the purpose of clamping a piece of stock upon said main frame, said clamping frame being provided with a portion serving as a guide for enabling the operator to position the piece of stock to be operated upon, and means controllable by movements of said casing relatively to said frame for shifting the position of said clamping frame when said casing is moved relatively to said main frame.

24. A check protector, comprising an anvil die, a printing die, a casing carrying said printing die and adapted to swing for the purpose of causing said printing die to approach and recede from said anvil die, an inking device for inking said printing die, a frame partially inclosing said inking device and serving also as a clamping frame, means controllable by movements of said casing for shifting the position of said frame, said frame being provided with an edge for enabling the operator to position a piece of stock relatively to said anvil die.

25. A check protector, comprising an anvil die, a printing die movable toward and from said anvil die, means including a clamping frame movable relatively to said anvil die for the purpose of holding a check in position to be printed by said printing die and said anvil die, said clamping frame being further provided with a guide for determining the position to be occupied by a piece of stock when the printing takes place, and mechanism controllable by movements of said printing die relatively to said anvil die for shifting said clamping frame to a position for clamping said piece of stock.

In testimony whereof I have signed my name to this specification in the presence of two subscribing witnesses.

CHARLES HENERY SAMPSON.

Witnesses:
WILLIAM B. ZIMMER,
JAMES F. O'GRADY.

Copies of this patent may be obtained for five cents each, by addressing the "Commissioner of Patents, Washington, D. C."